United States Patent Office 3,689,309
Patented Sept. 5, 1972

3,689,309
EPOXY-VINYL COPOLYMER AND GRADED-RUBBER PAINT AND PROCESS
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,479
Int. Cl. C08g 45/04
U.S. Cl. 117—93.31                                    13 Claims

ABSTRACT OF THE DISCLOSURE

A radiation-curable paint which on a pigment and particulate filler-free basis consists essentially of vinyl monomers and a unique, alpha-beta olefinically unsaturated, rubber-comprising resin formed by a reacting a monoepoxy copolymer of vinyl monomers with a carboxy-functional, graded-rubber particle and reacting the resultant hydroxyl groups thereon with acrylyl chloride or methacrylyl chloride.

INVENTION

A unique, rubber-comprising, radiation-curable paint is provided by preparing a film-forming dispersion of vinyl monomers and an alpha-beta olefinically unsaturated, rubber-comprising resin formed by reacting a monoepoxy copolymer of vinyl monomers with a carboxy-functional, graded-rubber particle and reacting the resultant hydroxyl groups thereon with acrylyl chloride or methacrylyl chloride. The dispersion is applied to substrates, e.g. wood, glass, metal, shaped polymeric solid, etc., as a paint film and cured thereon by ionizing radiation, preferably an electron beam having average energy in the range of about 100,000 to about 500,000 electron volts.

(I) The monoepoxy copolymer

The alpha-beta olefinically unsaturated monoepoxy, copolymer of vinyl monomers used in the preparation of the polymeric component of these paints advantageously have average molecular weight in the range of about 1,000 to about 8,000, preferably about 1,500 to about 5,000. These copolymers consist essentially of carbon, hydrogen and oxygen. The preferred constituent monomers are esters of acrylic or methacrylic acid and a $C_1$–$C_8$ monohydric alcohol, and an epoxyacrylate, e.g., glycidyl methacrylate. Other vinyl monomers, preferably in minor proportion, can also be used.

The monoepoxy vinyl copolymer can be prepared by conventional methods for preparing vinyl monomer-comprising copolymers employing a free-radical initiator, e.g. benzoyl peroxide, dibutyl peroxide, 2,2′-azobis-(2-methylpropionitrile), hereinafter termed AIBN, etc., and a chain transfer agent for limiting molecular weight, e.g. dodecane thiol, benzene thiol, pentene thiol, butane thiol, etc. The concentration of initiator in the charge is advantageously about 3–4 weight percent. The concentration of chain transfer agent in the charge is advantageously about 2–3 weight percent. To provide the epoxy functionality, one of the constituent monomers will be an epoxyacrylate, e.g. glycidyl acrylate or methacrylate. The concentration of this component will vary from about 3 mole percent in the case of the higher molecular weights to about 7 mole percent in the case of the lower molecular weights. To provide the desired alpha-beta olefinic unsaturation, the reaction product of the epoxy-functional vinyl copolymer and the carboxy-functional graded-rubber is reacted with acrylyl chloride or methacrylyl chloride. This reaction is effected with the hydroxyl group resulting from the opening of the epoxide structure when the copolymer is reacted with the graded-rubber.

Under these conditions using these materials, a minor amount of the copolymer will be produced having two epoxide groups per molecule as well as a minor amount of copolymer having no free epoxide groups. The production of these materials is minimized by the use of the chain transfer agent and liberal use of initiator above described, by the proper proportioning of constituent monomers above described, and by intimate mixing of reactants during copolymer formation. A reaction product containing less than about 30 mole percent of the diepoxide copolymer and less than 15 mole percent of copolymer without epoxide groups is suitable for use in this invention. Preferably, the monoepoxy terminated copolymer comprises in excess of 88 mole percent of the reaction product. Concentration of reactive epoxy groups can be determined by the method involving addition of tetraethylammonium bromide followed by titration with perchloric acid in acetic acid using crystal violet as indicator. This method is described by R. R. Jay in Analytical Chemistry, vol. 36, page 667 (1964).

(II) The graded-rubber particles

The graded-rubber particle has a core of crosslinked, elastomeric, acrylic polymer, an outer shell comprising methyl methacrylate and a copolymerizable monomer which leaves unreacted a carboxyl group or a copolymerizable monomer which can be subsequently reacted with a second monomer which provides the resultant material with a free carboxyl group, and an intermediate layer which is a copolymer of the monomers used to form the core and the monomers used to form the outer shell.

The process for preparing these particulate materials is at least a two-stage process. In one method of preparation, a major amount of monofunctional monoacrylate is emulsion copolymerized in the first stage with a crosslinking amount of a di- or tri-functional monomer containing two or more non-conjugated terminal ethylenic groups, preferably a diacrylate, using a water-soluble free radical initiator and a suitable surfactant to yield a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second monomeric component, i.e., a mixture of about 80 to about 98, preferably about 85 to about 95, mole percent methyl methacrylate, and about 2 to about 20, preferably about 5 to about 15, mole percent of an alpha-beta olefinically unsaturated monocarboxylic acid, e.g., acrylic acid, methacrylic acid, etc., or a mixture of about 2 to about 20, preferably about 5 to about 15, mole percent of a carboxy-functional acrylic monomer and about 80 to about 98 mole percent of a monomer mixture selected from and consisting essentially of esters of acrylic or methacrylic acid and a $C_1$–$C_8$ monohydric alcohol, monovinyl hydrocarbons, diacrylates and divinyl hydrocarbons, is added slowly to the reaction mixture. The content of methyl methacrylate in the last described mixture is at least 30 mole percent. The polymerization process is continued to yield a stable latex of relatively uniform particle size and composition. A surfactant is used in forming the emulsion and additional surfactant may be added simultaneously with the second stage monomeric component.

The latex is coagulated, washed and dried to yield a finely divided white powder suitable for use in this invention. Generally, the particles are prepared from monomers that will provide a crosslinked acrylic, rubber-like core and a glass-like polymeric outer shell at room temperature, e.g., 20°–30° C. The terms "rubber-like" and "glass-like" are, of course, meaningless except when used in reference to a specific temperature or temperature range. The particles should be formulated so that the core retains its rubber-like properties and the outer shell retains its glass-like properties at temperatures encountered by articles of commerce in the intended field of use. Hence, for practical purposes, the monomers should be selected so that the core has a glass transition temperature that is substantially below that of the outer shell. Advantageously, the difference in glass transition temperature between the core and the shell is at least 50° C., preferably above 100° C.

The core is formed from a major amount of an alkyl, monofunctional, monoacrylate and a crosslinking amount of a di- or tri-functional monomer containing 2 or more non-conjugated terminal ethylenic groups. The monofunctional, alkyl monoacrylate is preferably an ester of a $C_2$–$C_8$ monohydric alcohol and acrylic acid, e.g., ethyl acrylate, butyl acrylate, hexyl acrylate 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylate.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylolethane, triacrylate, 1,1,1 - trimethylolethane trimethacrylate, 1,1,1 - trimethylolpropane triacrylate, 1,1,1-trimethylolpropane trimethacrylate, 1,4 - dimethylolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably $C_2$–$C_6$, dihydric alcohol. In another embodiment, the crosslinking agent is a triester of acrylic or methacrylic acid and a $C_2$–$C_8$, preferably $C_2$–$C_6$, trihydric alcohol.

In the first reaction stage, there is preferably employed about 80 to about 98 mole percent of a monofunctional, monoacrylate and about 20 to about 2 mole percent of the crosslinking agent.

In the second stage reaction, it is preferred to use a mixture of about 80 to about 98, preferably about 85 to about 95 mole percent methyl methacrylate and about 2 to about 20, preferably about 5 to about 15, mole percent of acrylic or methacrylic acid. These are added before the first reaction ceases. The amounts of the second stage reactants relative to the combined first stage reactants may vary widely depending upon the physical properties desired in the final product, i.e., from about 10 to about 90 to about 90 to about 10 weight percent.

The methyl methacrylate concentration in the outer shell is advisedly at least about 30 mole percent with the balance of the monofunctional component being made up of monofunctional monoacrylates, e.g., esters of $C_2$–$C_8$ monohydric alcohols and either acrylic or methacrylic acid, or monofunctional vinyl hydrocarbons such as styrene, methyl substituted styrenes, e.g., alpha methyl styrene, vinyl toluene, etc. It will also be advantageous at times to have a limited amount of crosslinking in the outer shell and hence to include in said "balance" a minor amount of a diacrylate, e.g., 1 to 30 mole percent of a diester of acrylic or methacrylic acid and a $C_2$–$C_8$, preferably $C_2$–$C_6$, dihydric alcohol, or divinyl hydrocarbon, e.g., 1 to 30 mole percent of divinyl benzene. The physical properties of the outer shell may also be modified by replacing up to about 30 mole percent of the methyl methacrylate with acrylonitrile, methacrylonitrile, or vinyl acetate.

The initial monomer charge is usually emulsified by one or more micelle-forming compounds composed of a hydrophobic part, such as a hydrocarbon group containing 8 or more carbon atoms, and a hydrophilic part, such as alkaline metal or ammonium carboxylate groups, phosphate or sulfate partial ester groups, sulfonate groups, and the like. Exemplary emulsifying agents include alkali metal sulfonates of styrene, naphthalene, decyl benzene and dodecyl benzene; sodium dodecyl sulfate; sodium stearate; sodium oleate; sodium alkyl aryl sulfonates; polyoxyethylene sulfates and phosphates; the ethylene oxide condensates with long chain fatty acids, alcohols, and mercaptans and the alkali metal salts or rosin acids. These materials and techniques of employment of emulsion formation and maintenance are well known to the art and have no unusual application here. As they are conventional materials employed in a conventional manner further description is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which incorporate mild reducing agents such as sulfites and thiosulfites and redox reaction promotors such as transition metal ions.

A chain transfer agent or a mixture of chain transfer agents may be added to the reaction medium to limit the molecular weight of the polymer. Such chain transfer agents are generally mercaptans such as dodecane thiol, pentane thiol, and butane thiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures, as from 0° C. to 80° C. in the case of activated systems.

The graded-rubber particles above described and this method of preparation are disclosed by Ray A. Dickie and Seymour Newman in their patent application Ser. No. 100,464 filed of even date with this application.

In another method of preparation, hereinafter illustrated, the rubber particles are formed in an aliphatic hydrocarbon medium.

(III) Reaction of epoxy polymer with carboxy rubber

One part by weight of the rubber particles are swollen by addition of one part by weight of benzene and then dispersed in 10 parts by weight of isooctane or other suitable organic material.

Monoepoxy vinyl copolymer in an amount to provide one epoxy group for each carboxyl group on the original carboxy rubber is then added with 0.02 part of pyridine. The contents are maintained at 80° C. for about 4 hours.

(IV) Reaction of rubber-comprising resin with acyl halide

To the above mixture is added an acyl halide, preferably acrylyl chloride or methacrylyl chloride, in an amount sufficient to react with at least 80 percent, preferably an excess, of the hydroxyl groups formed by the opening of the epoxide rings thereby forming an acrylic or methacrylic ester with at least a major portion of these hydroxyl groups. Esters will also be formed where unreacted glycidyl groups exist, as in the case of those copolymer molecules aforementioned which have two glycidyl groups. The temperature is maintained at 80° C. for another 4 hours.

The isooctane and the benzene are then removed under reduced pressure and the resultant mass dispersed in 2 to 10 parts of acrylic monomers.

(V) Vinyl monomers employed in the paint dispersion

The paint binder dispersion advantageously contains about 20 to about 80, preferably about 25 to about 75, weight percent vinyl monomers and about 20 to about 80, preferably about 25 to about 75, weight percent of the polymeric component, i.e., the alpha-beta olefinically unsaturated rubber-comprising resin formed by reacting the aforedescribed alpha-beta olefinically unsaturated, polymeric component, i.e., the reaction product of the alpha-beta olefinically unsaturated, monohydroxy, copolymer of vinyl monomers and the carboxy-functional, graded-rubber particle. Obviously, the polymeric component may also contain other alpha-beta olefinically unsaturated resins such as those disclosed in U.S. Pats. 3,437,512; 3,437,513; 3,437,514 and 3,509,234.

Monomer type of concentration provide one means for adjusting the viscosity of the paint dispersion to conform to the methods of application desired, e.g., spray coating, roll coating, etc. In functional terms, the amount of vinyl monomer present is at least sufficient to convert the alpha-beta olefinically unsaturated, rubber-comprising resin into a cross-linked continuous coating on the surface of a substrate when a film of such coating dispersion is exposed to ionizing radiation, e.g., electron beam.

Vinyl monomers employed may be monofunctional, monoacrylates formed by the esterification of acrylic or methacrylic acid and a $C_1$–$C_8$, preferably $C_1$–$C_6$, monohydric alcohol, e.g., methyl methacrylate, ethyl acrylate, butyl acrylate, butyl methacrylate, 2-ethyl hexyl acrylate, etc. The monomer mixture may also include a minor amount, e.g., 1 to 30 mole percent of diacrylates, e.g., the diesters of acrylic or methacrylic acid and a $C_2$–$C_6$ diol such as 1,3-butylene diacrylate, 1,3-butylene dimethacrylate, 1,6-hexamethylene diacrylate, 1,6-hexamethylene diamethacrylate, ethylene glycol dimethacrylate, etc.

Monovinyl hydrocarbons, e.g., styrene, alpha-methyl sytrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1$–$C_8$ monohydric alcohol and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of these monovinyl hydrocarbons.

(VI) Preparation and application of the coating dispersion to a substrate

By adjusting the viscosity of the coating dispersion to a viscosity compatible with the desired method of coating, these coatings may be applied by any of the conventional methods, e.g., brushing, spraying, roll coating, curtain coating, flow coating, etc.

The viscosity of the paint binder solution may be adjusted by varying the molecular weight of the alpha-beta olefinically unsaturated, rubber-comprising resin. This may be accomplished by controlling the average number of functional groups per graded-rubber particle by controlling the concentration of carboxyl bearing monomer in the outer shell, particularly in the final portion of the monomer mixture introduced into the reaction medium when the graded-rubber particle is produced. The viscosity may also be regulated by varying the relative concentration of the resin component with respect to the vinyl monomer component and/or by varying the relative concentrations of dissimilar monomers within the vinyl monomer component. The binder dispersion may be applied to the substrate essentially free of non-polymerizable, organic solvents and/or diluents or it may be applied with the solvent and/or diluents or it may be applied with the solvent and/or diluents in a method of application wherein the solvents and/or diluents are flashed off prior to polymerization.

Coatings may be applied to any substrate, e.g., metal, wood, glass, polymeric solids, etc. These coatings will ordinarily be applied to an average depth in the range of about 0.1 to about 4 mils, more commonly about 0.5 to about 2 mils.

(VII) Curing the coatings

Films formed of the paints of this invention can be cured with ionizing radiation at relatively low temperatures, e.g., room temperature (20° to 25° C.) or a temperature between room temperature and that temperature at which significant vaporization of its most volatile component is initiated, ordinarily between 20° C. and 75° C. The radiation energy is applied at dose rates of about 0.1 to about 100 mrad per second on a workpiece, preferably a moving workpiece, with the coating receiving a total dose in the range of about 1 to about 25 commonly about 8 to about 15 mrad.

The term "ionizing radiation" as employed herein means radiation having sufficient energy to remove an electron from a gas atom, forming an ion, hence radiation with minimum energy of, or equivalent to, at least about 5,000 electron volts except when the curing is carried out in a vacuum. The preferred method of curing films of the instant paint binders on the substrates to which they have been applied is by subjecting such films to a beam of polymerization effecting electrons which at its source of emission is within the range of, or equivalent to, about 100,000 to about 500,000 electron volts. If irradiation is carried out in vacuum or at reduced pressure, this energy range may be considerably lower. In this method of curing, it is preferred to employ a minimum of about 25,000 volts per inch of distance between the radiation emitter and the workpiece where the intervening space is occupied by air or other gas of comparable density. Adjustment is made for the relative resistance of the intervening gas which is preferably an oxygen-free inert gas such as nitrogen or helium.

In this application, the term "paint" is meant to include finely ground pigment and/or filler in the binder, the binder without pigment and/or filler or having very little of the same, which can be tinted, if desired. Thus, the binder, which is ultimately converted to a durable film resistant to wear, weather, etc. can be all or virtually all that is used to form the film or it can be a vehicle for pigmentary and/or mineral filler material.

The abbreviation "mrad" as employed herein means one million rad. The term "rad" as employed herein means that dose of radiation which results in the absorption of 100 ergs of energy per gram of absorber, i.e., coating film. The electron emitting means may be a linear electron accelerator capable of producing a direct current potential in the range hereinbefore mentioned. In such device, electrons are ordinarily emitted from a hot filament and accelerated through a uniform voltage gradient. The electron beam, which may be about ⅛ inch in diameter at this point, is then scanned in one direction to make a fan-shaped beam and then passed through a metal window, e.g., aluminum-copper alloy, or magnesium-thorium alloy of about 0.003 inch thickness. This invention will be more fully understood from the following examples:

EXAMPLE 1

(A) Preparation of the graded-rubber particles

Graded-rubber particles are prepared in aqueous medium using the following procedure:

Materials:
(1) Deionized water _____ grams__ 375
(2) Surfactant [1] _____ do____ 5.1
(3) Ethyl acrylate _____ do____ 175
(4) 1,3-butylene dimethacrylate _____ do____ 20
(5) Methacrylic acid _____ do____ 5
(6) Ammonium persulfate _____ do____ [2] 1
(7) Sodium formaldehyde sulfoxylate
    ($NaHSO_4 \cdot CH_2O \cdot 2H_2O$) _____ do____ [2] 0.7
(8) t-Butylhydroperoxide (70%) _____ drops__ 5

[1] Anionic phosphate ester type.
[2] In 5 ml. of water.

In a reaction flask dissolve ¾ of surfactant in water and adjust pH to 90 by adding 50% sodium hydroxide solution. Add initiators (items 5, 6, and 7) and one-half of the monomers and stir for 15 minutes with flow of nitrogen. The mix is heated to 45° C. When the temperature then begins to rise by reaction isotherm, one adds the other half of the monomers and the remainder of the surfactant. The temperature is maintained at 65° C. and the addition is completed in 45 minutes. The pH is adjusted to 9.0 by adding aqueous ammonia and the following materials are added to form the shell:

Materials:
Methyl methacrylate _____ grams__ 50
Methyacrylic acid _____ do____ 10
Surfactant [1] _____ do____ 0.2
Pentane thiol _____ do____ 1.5
t-Butylhydroperoxide _____ drops__ 3

[1] Same as used in formation of core.
[2] In 2 ml. water.

The addition is completed in 30 minutes while maintaining the temperature at 65° C. The emulsion is then cooled and coagulated by adding 25 ml. of concentrated hydrochloric acid. The coagulate is washed with methanol and dried at 40° C. under vacuum.

(B) Preparation of monohydroxy vinyl copolymer

Materials: Grams
Glycidyl methacrylate _____ 142
Methyl methacrylate _____ 3,000
AIBN [1] _____ 80
Toluene _____ 3,000

[1] 2-azobis (2-methyl propionitrile).

Procedure: In a reaction flask filled with condenser, nitrogen inlet, stirrer and dropping funnel is placed the toluene where it is heated to reflux. The mixture of the monomers and initiators is then added at a constant rate over a period of 4 hours. One gram of AIBN in 100 grams of toluene is then added over a period of 15 minutes and refluxing continued for one additional hour.

The polymer is isolated by evaporation of toluene or by coagulation in a large volume of hexane. The polymer has a number average molecular weight of about 3,200 and contains an average of about one epoxy group per molecule.

(C) Reaction of epoxy polymer with carboxy rubber

One molar part of the carboxy-functional rubber particles (one mole free carboxyl) are swollen by an equal weight of benzene and then dispersed in 10 times its weight isooctane. Monoepoxy copolymer (prepared in (B)) in an amount to provide about one epoxy group per one carboxy group on the rubber particles is then added. There is added 0.02 part of pyridine and the temperature is maintained at 80° C. for 4 hours.

(D) Reaction of rubber-comprising resin with acyl halide

To the above mixture is added 103 grams methacrylyl chloride. The temperature is maintained at 80° C. for another 4 hours. The isooctane and the benzene are then removed under reduced pressure and the resultant mass dispersed in 2 to 10 parts of acrylic monomers.

(E) Coating of the substrates

This dispersion, which is now ready for pigmentation if desired, is adjusted by adjusting the methyl methacrylate concentration to provide a paint binder dispersion containing 50 weight percent methyl methacrylate and 50 weight percent of the alpha-beta olefinically unsaturated reaction product of the vinyl copolymer and the graded-rubber particles. This dispersion is applied to the substrate surfaces, i.e., wood, metal, glass, and shaped polymeric solid (acrylonitrile-butadiene-styrene copolymer) to the average depth of about 0.7 mil (0.0007 inch) and cured by exposure to electron beam radiation. The conditions of irradiation are as follows:

Potential—275 kv.
Current—30 ma.
Distance, emitter to workpiece—10 in.
Dose—10–15 mrad
Atmosphere—nitrogen

EXAMPLE 2

The procedure of Example 1 is repeated with the difference that 96 grams of acrylyl chloride is substituted for the methacrylyl chloride.

EXAMPLE 3

The procedure of Example 1 is repeated with the difference that the constituent monomers, initiator and chain transfer agent used in preparing the copolymer are as listed below:

Grams
Glycidyl methacrylate _____ 142
Methyl methacrylate _____ 2,748
Pentane thiol _____ 30
AIBN _____ 30

EXAMPLE 4

The procedure of Example 3 is repeated with the difference that the constituent monomers used in preparing the copolymer are as listed below:

Grams
Glycidyl methacrylate _____ 126
Methyl methacrylate _____ 116

EXAMPLE 5

The procedure of Example 1 is repeated with the difference that an equimolar amount of glycidyl acrylate is substituted for the glycidyl methacrylate.

EXAMPLE 6

The procedure of Example 1 is repeated with the difference that in the preparation of the core of the graded-rubber particles an equimolar amount of butyl acrylate is substituted for the ethyl acrylate.

EXAMPLE 7

The procedure of Example 1 is repeated with the difference that in the preparation of the core of the graded-rubber particles an equimolar amount of 2-ethyl hexyl acrylate is substituted for the ethyl acrylate.

EXAMPLE 8

The procedure of Example 1 is repeated with the difference that in the preparation of the core of the graded-rubber particles an equimolar amount of 1,3-butylene diacrylate is substituted for the 1,3-butylene dimethacrylate.

EXAMPLE 9

The procedure of Example 1 is repeated with the difference that a vinyl monomer mixture consisting of 2 molar parts of styrene and 1 molar part of methyl methacrylate is substituted for the methyl methacrylate component of the paint.

EXAMPLE 10

The procedure of Example 1 is repeated with the difference that a vinyl monomer mixture consisting of 2 molar parts of styrene and 1 molar part of butyl methacrylate is substituted for the methyl methacrylate component of the paint.

EXAMPLE 11

The procedure of Examples 1 and 2 are repeated with the difference that a vinyl monomer mixture consisting of 2 molar parts methyl methacrylate, 1 molar part ethyl acrylate and 1 moler part 2-ethyl hexyl acrylate is substituted for the methyl methacrylate component of the paint.

EXAMPLE 12

The procedures of Examples 1 and 2 are repeated with the difference that a vinyl monomer mixture consisting of 2 molar parts methyl methacrylate, 1 molar part methyl styrene and 1 molar part butyl acrylate is substituted for the methyl methacrylate component of the paint.

EXAMPLE 13

The procedures of Examples 1 and 2 are repeated with the difference that a vinyl monomer mixture consisting of 2 molar parts styrene, 1 molar part 1,3-butylene dimethacrylate, and 1 molar part methyl methacrylate is substituted for the methyl methacrylate component of the paint.

EXAMPLE 14

The procedures of Examples 1 and 2 are repeated with the difference that a vinyl monomer mixture consisting of 2 molar parts methyl methacrylate, 1 molar part styrene, and 1 molar part divinyl benzene is substituted for the methyl methacrylate component of the paint.

EXAMPLE 15

The procedures of Examples 1 and 2 are repeated except for the preparation of the carboxy-functional graded-rubber particles. The cores of the particles are here formed from about 85 mole percent butyl acrylate and about 15 mole percent divinyl benzene, and the outer shells are here formed from a monomer mixture consisting of 30 mole percent methyl methacrylate, 15 mole percent alpha methyl styrene, 10 mole percent ethyl acrylate, 10 mole percent acrylonitrile, 10 mole percent methacrylonitrile, 10 mole percent butyl methacrylate, 5 mole percent vinyl acetate and 10 mole percent methacrylic acid. The monomers used to form the outer shell excepting the methacrylic acid are divided into three portions. After the first two portions are slowly added to the reaction mixture, the final portion is mixed with the methacrylic acid and added dropwise to the reaction mixture over a 45 minute period.

EXAMPLE 16

The procedures of Examples 1 and 2 are repeated except for the preparation of the carboxy-functional graded-rubber particles. The outer shells are here formed from a mixture of about 95 mole percent methyl methacrylate and about 5 mole percent methacrylic acid. The monomers used to form the outer shell excepting the methacrylic acid are divided into four equal portions. After the first three portions have been slowly added, the final portion is mixed with the methacrylic acid and added dropwise to the reaction mixture over a 45 minute period.

EXAMPLE 17

The procedures of Examples 1 and 2 are repeated except for the preparation of the carboxy-functional graded rubber particles. The cores of the particles are here formed from about 90 mole percent ethyl acrylate and about 10 mole percent of 1,1,1-trimethylolpropane trimethacrylate.

EXAMPLE 18

The procedures of Examples 1 and 2 are repeated except for the preparation of the carboxy-functional graded-rubber particles. The cores of the particles are here formed from about 90 mole percent 2-ethyl hexyl acrylate and about 10 mole percent of 1,4-dimethylolcyclohexane dimethacrylate.

EXAMPLE 19

The procedures of Examples 1 and 2 are repeated except for the preparation of the carboxy-functional graded-rubber particles. The cores of the particles are here formed from about 90 mole percent butyl acrylate and about 10 mole percent divinyl benzene.

EXAMPLE 20

The procedures of Examples 1 and 2 are repeated except for the difference that the curing of the coatings upon the substrates is carried out using an electron beam having an average potential of about 260,000 electron volts.

EXAMPLE 21

The procedures of Examples 1 and 2 are repeated except for the differences that the curing of the coatings upon the substrates is carried out using a helium atmosphere and an electron beam having an average potential of about 150,000 electron volts.

EXAMPLE 22

The procedures of Examples 1 and 2 are repeated except for the differences that the curing of the coating upon the substrates is carried out using an atmosphere comprising a major amount of nitrogen and a minor amount of carbon dioxide and an electron beam having an average potential of about 325,000 electron volts.

EXAMPLE 23

The procedures of Examples 1 and 2 are repeated with the differences that the coating dispersion consists essentially of about 80 parts by weight of the alpha-beta olefinically unsaturated reaction product of the monohydroxy vinyl copolymer and the carboxy-functional graded-rubber particles and about 20 parts by weight of an equimolar mixture of methyl methacrylate and styrene.

EXAMPLE 24

The procedures of Examples 1 and 2 are repeated with the difference that the coating dispersion consists essentially of about 20 parts by weight of the alpha-beta olefinically unsaturated reaction product of the monohydroxy vinyl copolymer and the carboxy-functional graded-rubber particles and about 80 parts by weight of vinyl monomers. The vinyl monomers are a mixture of 30 mole percent methyl methacrylate, 20 mole percent styrene, 20 mole percent ethyl acrylate, 10 mole percent acrylonitrile, 10 mole percent methacrylonitrile and 10 mole percent 1,3-butylene diacrylate.

EXAMPLE 25

The procedures of Examples 1 and 2 are repeated with the differences that the coating consists essentially of 50 parts by weight of the alpha-beta olefinically unsaturated reaction product of the monohydroxy vinyl copolymer and the carboxy-functional graded-rubber particles and about 50 parts by weight of vinyl monomers. The vinyl monomers are a mixture of 50 mole percent styrene, 30 mole percent methyl methacrylate, 20 mole percent butyl methacrylate and 10 mole percent 1,4-dimethylolcyclohexene dimethacrylate.

EXAMPLE 26

The procedures of Examples 1 and 2 are repeated with the differences that the coating dispersion consists essentially of 30 parts by weight of the alpha-beta olefinically unsaturated reaction product of the monohydroxy vinyl copolymer and the carboxy-functional graded-rubber particles and about 70 parts by weight of vinyl monomers. The vinyl monomers are a mixture of about 85 mole percent methyl methacrylate and about 15 mole percent divinyl benzene.

EXAMPLE 27

The procedure of Examples 1 and 2 are repeated with the difference that the carboxy-functional graded-rubber particles are prepared in the following manner:

(A) A mixture is formed from the following:

| Materials: | Grams |
| --- | --- |
| Ethyl acrylate | 80.0 |
| 1,3-butylene dimethacrylate | 20.0 |
| Dispersing agent [1] | 3.0 |
| AIBN [2] | 1.0 |

[1] An amphipatic copolymer (1 portion soluble in the acrylic monomers and the other portion soluble in the solvent, e.g., dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg. KOH/g. The product is then reacted with methacrylic anhydride (170 g.). The resulting material is then copolymerized with an equal amount of methyl methacrylate using AIBN initiator (9 g.) and butyl acetate solvent. This method of producing this dispersing agent is described in detail by K. E. J. Barratt and H. R. Thomas, Journal of Polymer Science, Part A-1, vol. 7, 2625 (1969). Other dispersing agents which are effective for stabilizing suspension in hydrocarbon liquids may be used in place of the above described material.
[2] 2,2′ azobis-(2-methyl propionitrile).

(B) The mixture of the above listed material is added to 1,000 grams n-dodecane under nitrogen. The mix is warmed to 40° C. When the exotherm starts the temperature is allowed to rise to 80° C. The temperature is maintained at 80° C. for 30 minutes.

(C) The reaction mixture is maintained in a nitrogen atmosphere and there is added slowly with stirring a mixture of the following materials:

| Materials: | Grams |
| --- | --- |
| Methyl methacrylate | 320.0 |
| Methacrylic acid | 42.0 |
| Dispersing agent [1] | 3.0 |
| AIBN | 6.0 |
| n-Dodecane | 1,000.0 |

[1] Same as in (A).

EXAMPLE 28

The procedures of Examples 1 and 2 are repeated except for the difference that the vinyl copolymer and graded-rubber reaction product is formed from 0.25 molar part of the copolymer and 1 molar part of the carboxy-functional graded-rubber particles.

EXAMPLE 29

The procedures of Examples 1 and 2 are repeated except for the difference that the vinyl copolymer and graded-rubber reaction product is formed from 0.5 molar part of the vinyl copolymer and 1 molar part of the carboxy-functional graded-rubber particles.

The terms "acrylate" and "acrylates," when used herein without a modifier distinguishing between esters of acrylic and methacrylic acid, shall be understood to include both. This, of course, does not apply to a naming of a specific compound.

Carboxyl number and hydroxyl number can be determined by titration and molecular weight calculated using the methods described in "Preparative Method of Polymer Chemistry" by W. R. Sorenson and T. W. Campbell, Interscience Publishers, New York, N.Y., U.S.A. (1961) at page 134.

It will be understood by those skilled in the art that modifications can be made within the foregoing examples in the scope of this invention as hereinbefore described and hereinafter claimed.

We claim:
1. A radiation-curable paint which on a pigment and particulate filler-free basis comprises a film-forming dispersion of about 20 to about 80 weight percent vinyl monomers and about 80 to about 20 weight percent of an alpha-beta olefinically unsaturated polymeric component consisting essentially of the product formed by reacting about 0.25 to 1 molar part of an epoxy-functional copolymer of vinyl monomers containing an average of about 3 to about 7 mole percent of an epoxy acrylate and having average molecular weight between about 1,000 and about 8,000 with 1 molar part of carboxy-functional particles of graded-rubber and reacting hydroxyl on said copolymer resultant from the reaction of epoxy group thereon with carboxyl of said carboxy-functional graded-rubber particle with acrylyl chloride or methacrylyl chloride, said molar part of particles of graded-rubber being measured by and equivalent to 1 molar part of reactive carboxy groups on the surfaces thereof, said particles of graded-rubber consisting essentially of

(1) about 10 to about 90 weight percent of a core of crosslinked acrylic polymer consisting essentially of
  (a) a minor and crosslinking amount of a di- or tri-functional monomer containing 2 or more non-conjugated terminal ethylenic groups, said minor and crosslinking amount not exceeding about 20 mole percent of the core reactants, and
  (b) a remainder consisting essentially of a monofunctional monoacrylate, said remainder constituting at a minimum about 80 mole percent of the core reactants, and
(2) about 90 to about 10 weight percent of an outer shell having glass transmission temperature above that of said core and consisting essentially of the polymerization product of monomer mixtures selected from the group consisting of
  (a) about 80 to about 98 mole percent methyl methacrylate and about 2 to about 20 mole percent of an alpha-beta olefinally unsaturated monocarboxylic acid, and
  (b) about 2 to about 20 mole percent of an alpha-beta olefinically unsaturated monocarboxylic acid and about 80 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and a $C_2$–$C_6$ dihydric alcohol and 0 to 30 mole percent of a monomer selected from acrylonitrile, methacrylonitrile and vinyl acetate, said mixture containing at least 30 mole percent methylmethcrylate.

2. A paint in accordance with claim 1 wherein said alpha-beta olefinically unsaturated monocarboxylic acid is selected from the group consisting of acrylic acid and methacrylic acid.

3. A paint in accordance with claim 1 wherein said di- or tri-functional monomer containing 2 or more non-conjugated terminal ethylenic groups is selected from the group consisting of divinyl benzene, a diester of acrylic or methacrylic acid and a $C_2$–$C_8$ dihydric alcohol, or a triester of acrylic or methacrylic acid and a $C_2$–$C_8$ trihydric alcohol.

4. A paint in accordance with claim 1 wherein said core is crosslinked acrylic polymer consisting essentially of butyl acrylate and a diacrylate selected from 1,3-butylene diacrylate and 1,3-butylene dimethacrylate.

5. A paint in accordance with claim 1 wherein said graded-rubber particles have average diameter in the range of about 0.04 to about 1 micron.

6. A paint in accordance with claim 1 wherein said minor and crosslinking amount constitutes about 2 to about 20 mole percent of the core reactants and said remainder constitutes about 80 to about 98 mole percent of the same.

7. A paint in accordance with claim 1 wherein said vinyl monomers in said film-forming dispersion are selected from esters of carylic acid and a $C_1$–$C_8$ monohydric alcohol, esters of methacrylic acid and a $C_1$–$C_8$ monohydric alcohol, $C_8$–$C_9$ monovinyl hydrocarbons, divinyl benzene, diesters of acrylic acid and a $C_2$–$C_8$ dihydric alcohol, and diesters of methacrylic acid and a $C_2$–$C_8$ dihydric alcohol.

8. A paint in accordance with claim 1 wherein said epoxy acrylate is selected from the group consisting of glycidyl acrylate and glycidyl methacrylate.

9. A paint in accordance with claim 1 wherein said copolymer of vinyl monomers is formed from said epoxy acrylate and esters of acrylic or methacrylic acid and a $C_1$–$C_8$ monohydric alcohol.

10. A paint in acocrdance with claim 1 wherein said outer shell has glass transition temperature at least 50° C. above that of said core.

11. The method of coating a substrate which comprises:
(A) applying to a surface of said substrate a film of radiation-curable point which on a pigment and particulate filler-free basis comprises a film-forming dispersion of about 20 to about 80 weight percent vinyl monomers and about 80 to about 20 weight percent of an alpha-beta olefinically unsaturated polymeric component formed by reacting about 0.25 to about 1 molar part of an epoxy-functional copolymer of vinyl monomers containing an average of about 3 to about 7 mole percent of an epoxy acrylate and having average molecular weight between about 1,000 and about 8,000 with 1 molar part of carboxy-functional particles of graded-rubber and reacting hydroxyl on said copolymer resultant from the reaction of epoxy group thereon with carboxyl of said carboxy-functional graded-rubber particle with acrylyl chloride or methacrylyl chloride, said molar part of a particles of graded-rubber being measured by an equivalent to 1 molar part of reactive carboxy groups on the surfaces thereof, said particles of graded-rubber consisting essentially of
(1) about 10 to about 90 weight percent of a core of crosslinked acrylic polymer consisting essentially of
(a) a minor and crosslinking amount of a di- or tri-functional monomer containing 2 or more non-conjugated terminal ethylenic groups, said minor and crosslinking amount not exceeding about 20 mole percent of the core reactants, and
(b) a remainder consisting essentially of a monofunctional monoacrylate, said remainder constituting at a minimum about 80 mole percent of the core reactants, and
(2) about 90 to about 10 weight percent of an outer shell having glass transmission temperature above that of said core and consisting essentially of the polymerization product of monomer mixtures selected from the group consisting of
(a) about 80 to about 98 mole percent methyl methacrylate and about 2 to about 20 mole percent of an alpha-beta olefinically unsaturated monocarboxylic acid, and
(b) about 2 to about 20 mole percent of an alpha-beta olefinically unsaturated monocarboxylic acid and about 80 to about 98 mole percent of of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and a $C_2$–$C_6$ dihydric alcohol and 0 to 30 mole percent of a monomer selected from acrylonitrile, methacrylonitrile and vinyl acetate, said mixture containing at least 30 mole percent methyl methacrylate, and (B) crosslinking said film upon said substrate by exposing said film to a beam of electrons having average energy in the range of about 100,000 to about 500,000 electron volts.

12. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 20 to about 80 weight percent vinyl monomers at least a major proportion of which are selected from esters of acrylic or methacrylic acid and a $C_1$–$C_8$ monohydric alcohol and $C_8$–$C_9$ monovinyl hydrocarbons, and about 20 to about 80 weight percent of an alpha-beta olefinally unsaturated polymeric component formed by reacting about 0.25 to about 1 molar part of an epoxy-functional copolymer of vinyl monomers containing an average of about 3 to about 7 mole percent of an epoxy acrylate and having molecular weight between about 1,000 and about 8,000 with 1 molar part of carboxy-functional particles of graded-rubber, and reacting hydroxyl on said copolymer resultant from the reaction of epoxy group thereon with carboxyl of said carboxy-functional graded-rubber particle with acrylyl chloride or methacrylyl chloride, said molar part of particles of graded-rubber being measured by and equivalent to 1 molar part of reactive carboxy groups on the surfaces thereof, said particles of graded-rubber consisting essentially of
(1) about 10 to about 90 weight percent of a core of crosslinked acrylic polymer consisting essentially of
(a) a minor and crosslinking amount of a di- or tri-functional monomer containing 2 or more non-conjugated terminal ethylenic groups, said minor and corsslinking amount not exceeding about 20 mole percent of the core reactants, and
(b) a remainder consisting essentially of a monofunctional monoacrylate, said remainder constituting at a minimum about 80 mole percent of the core reactants, and
(2) about 90 to about 10 weight percent of an outer shell having glass transmission temperature above that of said core and consisting essentially of the polymerization product of monomer mixtures selected from the group consisting of
(a) about 80 to about 98 mole percent methyl methacrylate and about 2 to about 20 mole percent of an alpha-beta olefinically unsaturated monocarboxylic acid, and
(b) about 2 to about 20 mole percent of an alpha-beta olefinically unsaturated monocarboxylic acid and about 80 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and a $C_2$–$C_6$ dihydric alcohol and 0 to 30 mole percent of a monomer selected from acrylonitrile, methacrylonitrile and vinyl acetate, said mixture containing at least 30 mole percent methyl methacrylate.

13. An article of manufacture in accordance with claim 12 wherein said copolymer has average molecular weight in the range of about 1,500 to about 5,000.

References Cited

UNITED STATES PATENTS

| | | | |
|---|---|---|---|
| 3,423,481 | 1/1969 | Mizutani | 260—836 |
| 3,437,514 | 4/1969 | Burlant | 260—872 |
| 3,450,796 | 6/1969 | Griffin | 260—885 |
| 3,502,745 | 3/1970 | Minton | 260—881 |
| 3,509,234 | 4/1970 | Burlant | 260—859 |
| 3,528,844 | 9/1970 | Burlant | 117—93.31 |

PAUL LIEBERMAN, Primary Examiner

U.S. Cl. X.R.

260—836, 885